J. T. AUGER.
ROTARY PUMP.
APPLICATION FILED DEC. 16, 1919.

1,369,073.

Patented Feb. 22, 1921.
5 SHEETS—SHEET 1.

INVENTOR:
JOSEPH T. AUGER.
BY Whiteley and Ruckman
ATTORNEYS.

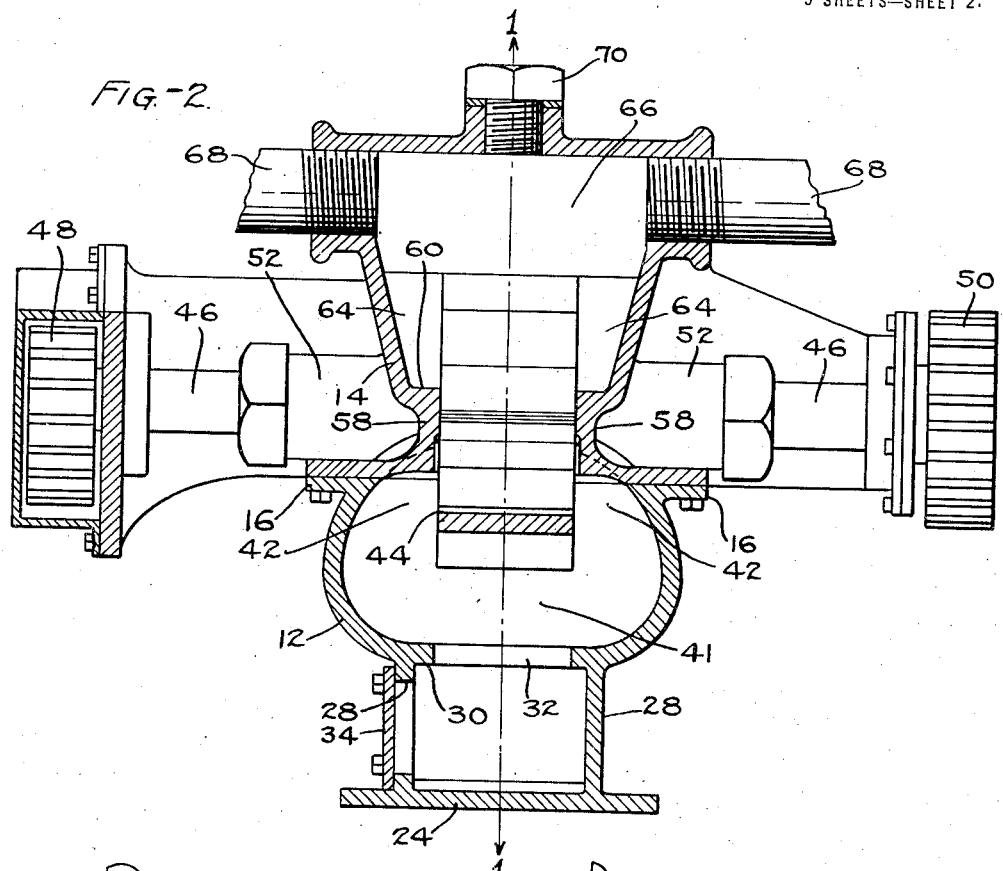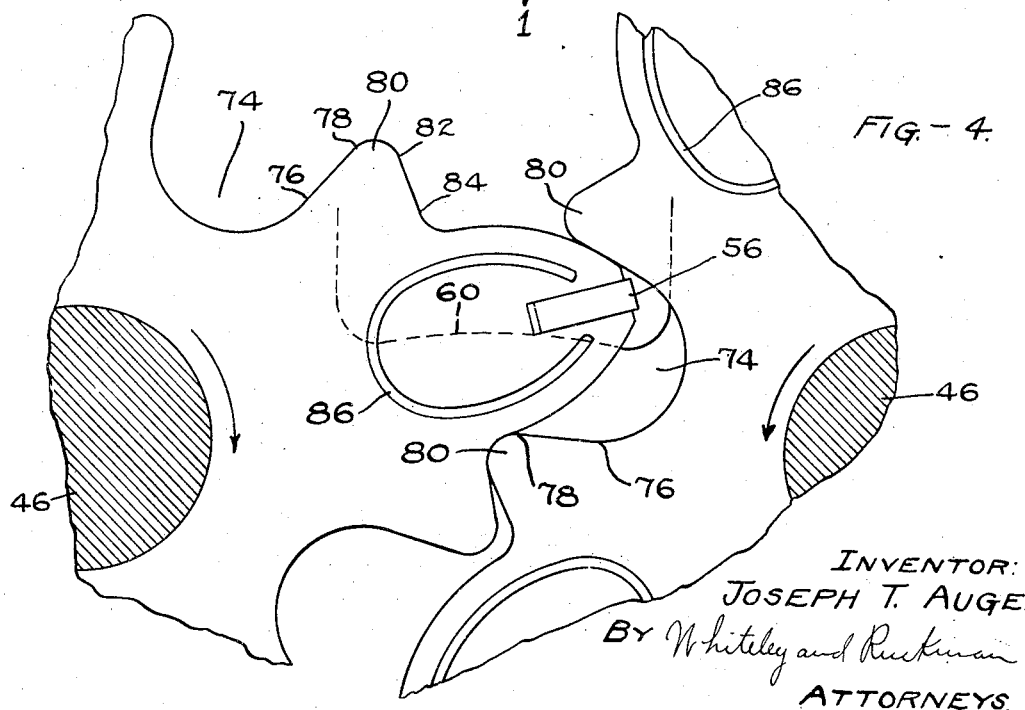

J. T. AUGER.
ROTARY PUMP.
APPLICATION FILED DEC. 16, 1919.

1,369,073.

Patented Feb. 22, 1921.
5 SHEETS—SHEET 3.

INVENTOR:
JOSEPH T. AUGER.
By Whiteley and Ruckman
ATTORNEYS.

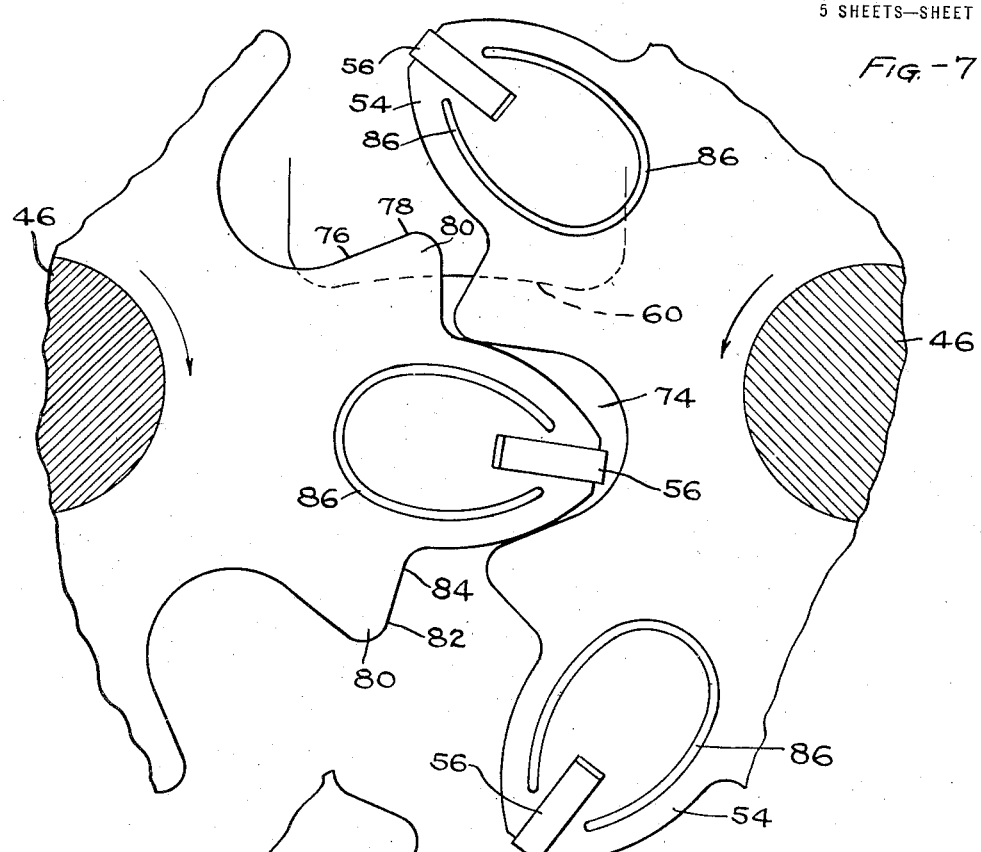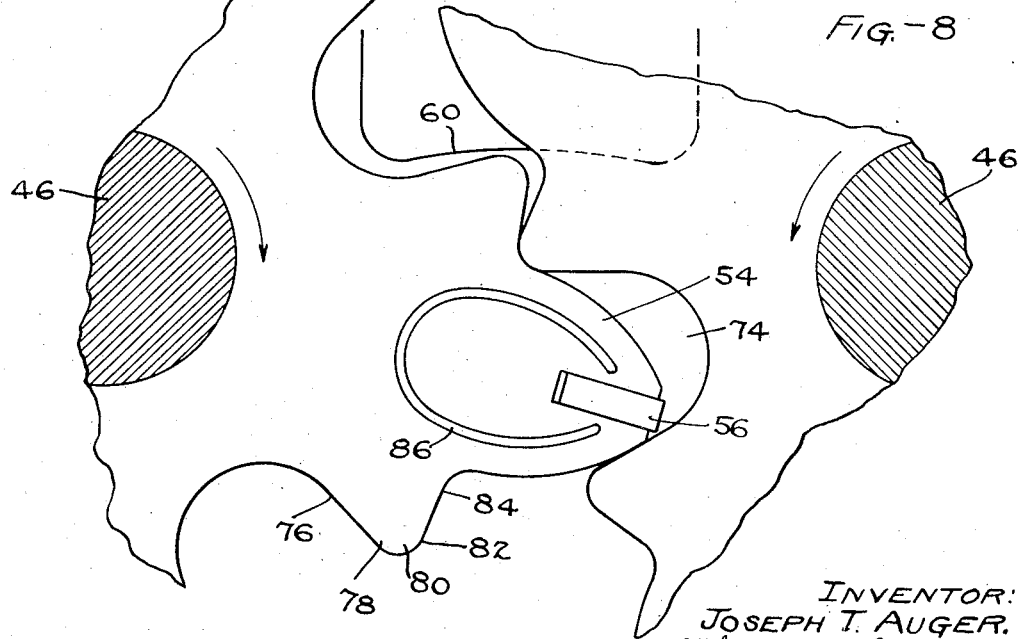

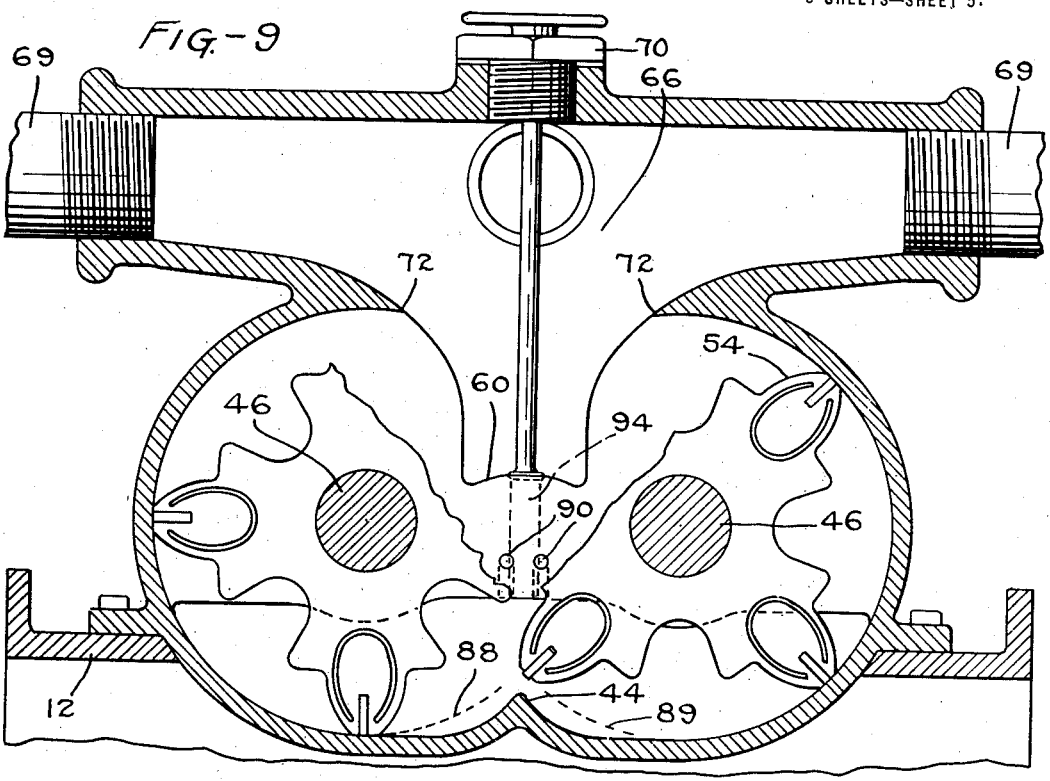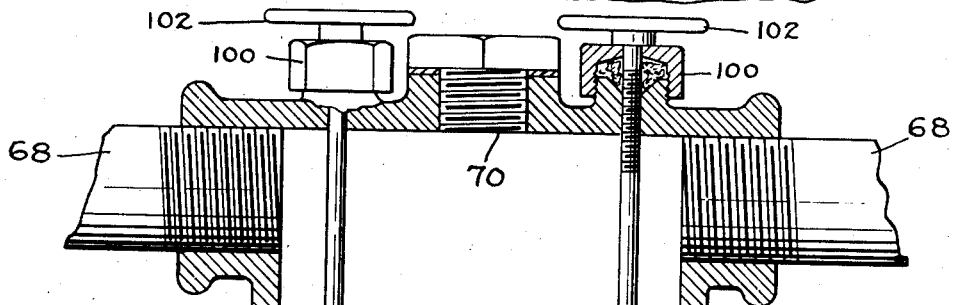

UNITED STATES PATENT OFFICE.

JOSEPH T. AUGER, OF MINNEAPOLIS, MINNESOTA, ASSIGNOR OF THREE-EIGHTHS TO E. M. FERGUSON, OF ST. PAUL, MINNESOTA, AND THREE-EIGHTHS TO E. DU LAC, OF MINNEAPOLIS, MINNESOTA.

ROTARY PUMP.

1,369,073.      Specification of Letters Patent.      Patented Feb. 22, 1921.

Application filed December 16, 1919. Serial No. 345,182.

*To all whom it may concern:*

Be it known that I, JOSEPH T. AUGER, a citizen of the United States, residing at Minneapolis, in the county of Hennepin and State of Minnesota, have invented certain new and useful Improvements in Rotary Pumps, of which the following is a specification.

My invention relates to rotary pumps, and in particular to pumps for use in connection with fire apparatus. An object is to provide a rotary pump which will have a high degree of efficiency, and at the same time will occupy only a comparatively small space. Other objects are to provide a rotary pump having a free and easy discharge for the water going through the pump, an interengagement of the piston blades without binding action, a water packing for the ends of the piston blades, a construction which avoids water-lock between the intermeshing piston blades, and a construction by means of which pressure in the hose can be relieved without reducing the speed of rotation of the pistons.

The full objects and advantages of my invention will appear in connection with the detailed description thereof, and the novel features embodied in my inventive idea will be particularly pointed out in the claims.

Figure 1:
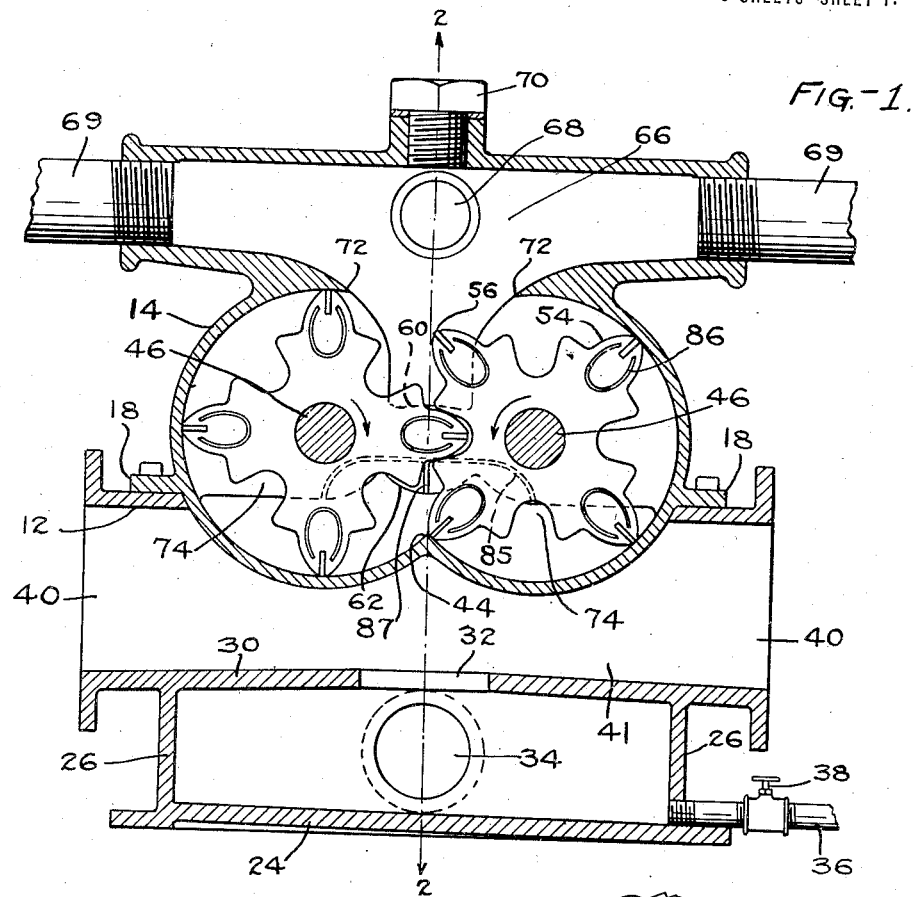
Figure 3:
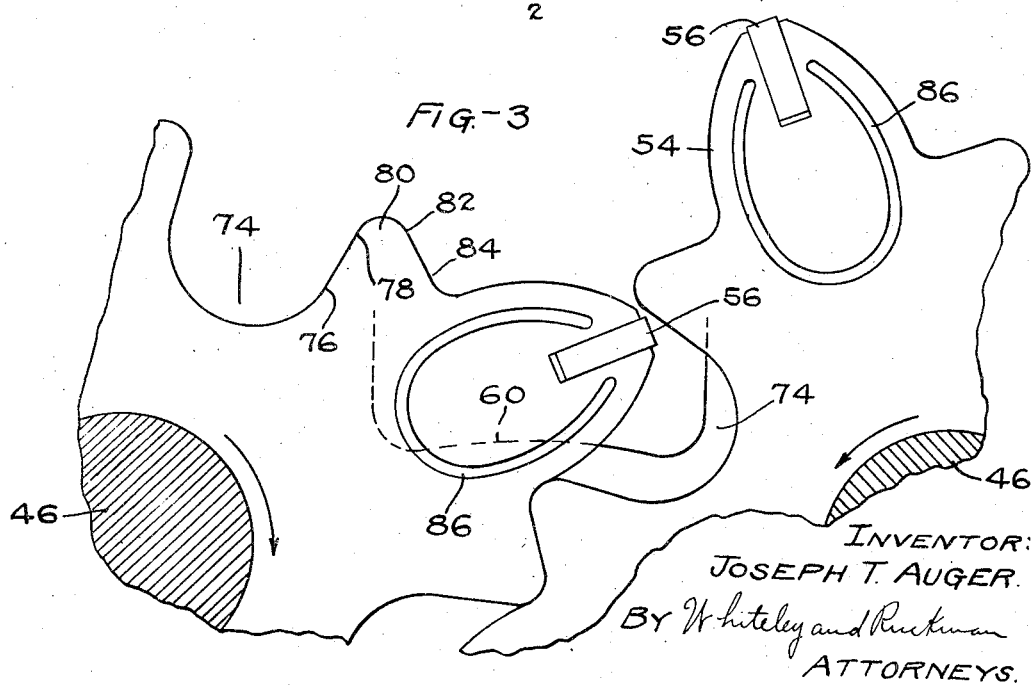
Figure 5:
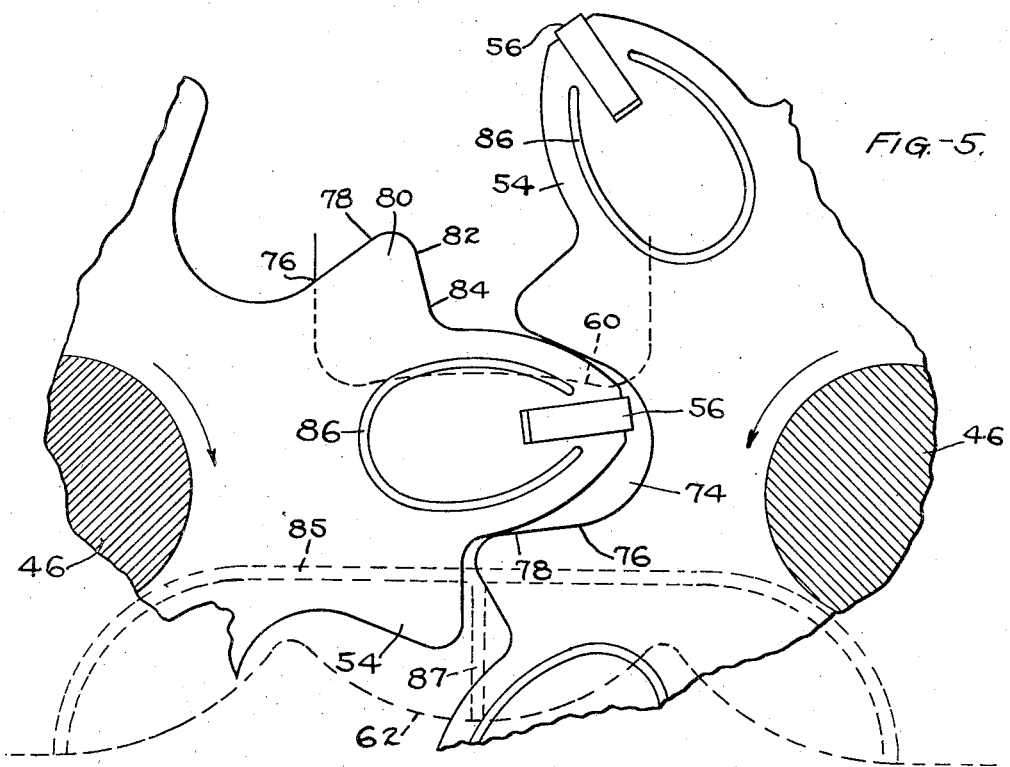
Figure 6:
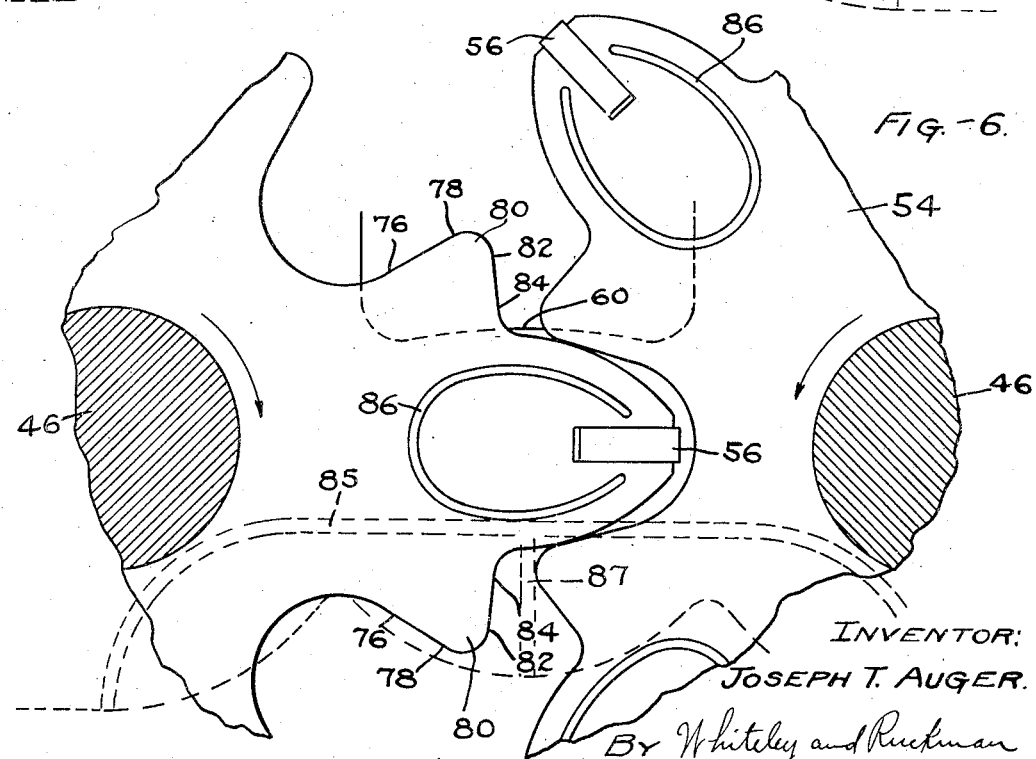

In the accompanying drawings which illustrate the application of my invention in two slightly different forms, Figure 1 is a vertical section substantially on the line 1—1 of Fig. 2. Fig. 2 is a vertical section substantially on the line 2—2 of Fig. 1. Fig. 3 is a fragmentary view showing a piston blade of one piston as it starts to enter the coöperating cavity of the other piston. Fig. 4 is a similar view showing the same piston blade advanced a little farther into the cavity. Fig. 5 is a similar view showing the piston blade just prior to reaching an intermediate position in the cavity. Fig. 6 is a similar view showing the piston blade in intermediate position in the cavity. Figs. 7 and 8 are similar views showing the piston blade advanced still farther. Fig. 9 is a vertical sectional view of a slight modification. Fig. 10 is a view taken at right angles to Fig. 9.

The casing of the pump is made up of a base casting 12 and an upper pump casing 14 secured together so as to form a water-tight joint by bolts passing into flanges 16 on the casting 12 and into flanges 18 on the casting 14. The base casting consists of a bottom plate 24, end walls 26, and side walls 28, all of these walls extending up to a horizontal partition plate 30, having a central opening 32 which allows grit, gravel, etc. to fall into the chamber formed by the parts just mentioned. This chamber is provided with a detachable closure 34 in order that accumulations of refuse material may be removed from the chamber whenever desired. The chamber is further provided with a drain pipe 36 controlled by a cock 38. Above the partition 30, the casing at its two ends is provided with inlet openings 40, which lead to an intake chamber 41 provided above the partition 30. The lower side walls of the casting 14 are bulged outwardly to meet bulged side walls of the casting 12, so as to form lateral intake openings 42 leading to piston chambers which will now be described. The casting 14 is so shaped as to provide two partially overlapping cylindrical piston chambers which extend downwardly into the top of the intake chamber 41. On account of this construction, the piston blades when in their lower position will always stand in water. The walls of the piston chambers at their lower line of intersection form a ridge 44 which serves to divide the water as it enters the piston chamber. Piston shafts 46 extend axially through both of the piston chambers and at their ends these shafts are provided with gears 48 and 50 by means of which they are driven in unison. These shafts extend through stuffing boxes 52 and inside of said chambers the shafts are provided with a plurality of intermeshing piston blades 54, the outer edges of which are provided with packing strips 56. The casting 14 is provided at each side with bridge members 58, the upper edges 60 of which at the middle portion are convexed slightly upwardly from a horizontal and these edges are preferably slightly below the upper portions of the shafts 46. The lower edges of the bridges are convexed downwardly at their middle portions as shown at 62 and the lower edges of the bridges at both sides of this convexed portion extend outwardly so that the greater portion of the lower surface of the bridges is substantially in line with the lower surface of the flanges 18 with which the pump casting 14 is provided. The walls of the casting 14 above the middle portion of the bridges bulge outwardly to form pockets 64 into which the water from the pistons passes on its way to the discharge chamber 66. The upper portion of the casting is provided with discharge pipes 68 and 69 serving for the attachment of the hose lines. The top of the casting is also provided with a screw plug 70 which may be removed for priming purposes and also for attachment of an air chamber device, if desired. The bridge members at both ends of the upper edge 60 curve upwardly and outwardly as indicated at 72 in Fig. 1, so that the walls of the pockets 64 merge gradually into the horizontal portion to which the discharge pipes 69 are connected. This provides for a free and easy discharge of the water with no abrupt surfaces to interfere therewith.

The piston blades 54 of each piston are separated by intervening cavities 74. The bottom walls of these cavities are curved and these curves merge into straight or flat portions constituting the side walls, these flat portions starting at the position indicated at 76 and extending to the position indicated at 78. From the position 78, the flat portions merge into the curved extremities of lugs 80 and these curved portions of the lugs merge into flat portions extending from the position indicated at 82 to the position indicated at 84 and from the latter position the lugs merge by curved surfaces into the surfaces of the piston plates 54, these last mentioned curves being so shaped as to snugly receive the curved edges of lugs 80. The distance from the position 76 to position 78 is greater than the distance from the position 82 to the position 84 so that the latter flat surfaces are of less width than the other flat surfaces. On account of the above mentioned construction, it results that the pair of pistons interengage and rotate in unison without any tendency to bind upon each other. The interengaging movement of the pistons may be traced by reference to Figs. 3–8 which show progressive positions of the parts which engage each other. It will be seen that the lateral outlet from the cavities 74 into the discharge pockets 64 is not closed until the piston blades 54 arrive at substantially their intermediate position in the cavities as shown in Figs. 1 and 6. The bridge members are provided on their inner faces with curved grooves 85 these grooves having their middle portions extending horizontally along the bridge members and the outer ends of the grooves extending through the lower surfaces of the bridges at points substantially underneath the shafts 46. From the centers of the grooves 85, vertical grooves 87 extend down through the lower surface of the bridge members. The grooves 85 and 87 provide passageways for the escape of water so that there is no liability of water-lock occurring when the piston blades are moving through their coöperating cavities. These grooves are so arranged that when the upper engaging surfaces of the piston blades and cavities pass below the upper surfaces of the bridge walls the lower engaging surfaces of the piston plates and cavities are passing below the grooves 85. In other words, as soon as the lateral outlet from the cavities 74 into the space above the bridge members is closed, passages extending through the lower portion of the bridge members for the escape of some of the water remaining in the cavities are opened up and there is no possibility for the water in the cavities being placed under compression. This action will be clear from a comparison of Figs. 5 and 6. In Fig. 15, the upper engaging surfaces of the piston blade and cavity have not quite passed below the upper surface of the bridge 60 but in Fig. 6 this condition has occurred and the lower engaging surfaces have passed below the groove 85 so that water can escape through this groove and also through the communicating groove 87. Both ends of the piston blades are provided with horse-shoe shaped grooves 86, the ends of which are located near opposite sides of the packing strips 56 and the middle portions of which are located near the base portions of the piston blades. The grooves 86 provide an efficient water packing for the ends of the piston blades while passing the bridge members, so that slippage of water is prevented. These grooves become filled with water when the blades rotate through that portion of the piston chambers below the bridges and as soon as the ends of the blades start to move upwardly in contact with the bridges, water is locked in these grooves. On account of the curved shape of the grooves 86 each of these grooves provides a double water packing and since it is not desirable to run the grooves to meet the packing strips 56, a horseshoe shape is thus given to the grooves. By reference to Fig. 3 it will be seen that as the lower portion of the groove 86 passes the upper edge 60 of the bridge on the down stroke, any sand or grit which collects on the bridge is given an opportunity to escape and be carried away by the groove to the space beneath the bridge. By reference to Fig. 5 it will be seen that as the upper portion of the groove passes the upper edge 60 a further opportunity is given for the escape of sand and grit through the groove. In this manner the tendency of the sand and grit to cut away the bridge is in a large measure overcome.

Figs. 9 and 10 illustrate a slight modification in structure and the same reference characters previously employed will be used so far as applicable. The walls of the overlapping piston chambers instead of being entirely cylindrical are flattened beginning at the ridge 44 and extending each side thereof to positions substantially underneath the shafts 46. Clearance is thus provided between the walls of the chambers and the edges of the piston blades, the path of the blade edge being indicated by the dotted lines 88 and 89. This construction is desirable when pumping water containing sand and gravel since the clearance provided at the inception of the pumping stroke decreases liability of solid matter being caught between the edges of the blades and the walls of the piston chambers. Figs. 9 and 10 also illustrate a modified form of escape passages which I may employ. Horizontal holes 90 are drilled a short distance into the inner surfaces of the bridges at a point where the space included between a piston plate and coöperating cavity will open thereinto at the time when the lateral discharge from the cavity is closed above the bridges, as explained in connection with Figs. 5 and 6. The short horizontal holes 90 lead into vertical holes or bores 92 extending through the lower surface of the bridges and completing passageways for the escape of water to avoid water lock. Figs. 9 and 10 also illustrate a construction for relieving pressure in the hose lines without the necessity of reducing the speed of the pump. The bridge members are provided with vertical bores 94, the upper ends of which are provided with valve seats for receiving valves 96 which are on the lower ends of valve stems 98. These valve stems pass through the upper wall of the discharge chamber with screw-threaded engagement and after passing through stuffing boxes 100 are provided with handwheels 102 at their upper ends. When it is desired to relieve the pressure in the hose lines, as for instance when they are to be moved from one place to another, the handwheels 102 are turned so as to unseat the valves. Water will then pass from the upper side of the bridges through bores 94 instead of being forced through the hose.

The operation and advantages of my rotary pump will be readily understood in connection with the foregoing description. The construction of the piston blades and coöperating cavities and the construction of the lugs and coöperating engaging surfaces are such that the interengaging parts move past each other without any binding action. The positioning of the upper surface of the bridges is such that most of the water in the pump cavities is discharged from the pump and the upward and outward curvature of the walls 72 provides for a free and easy discharge of the water on account of the absence of abrupt changes in direction. The provision of passages in the bridges for the escape of water which would otherwise be imprisoned in the piston cavities prevents water-lock. The grooves in the ends of the piston blades provide a very efficient water packing which does not wear out as does the customary packing while the provision of vertical holes extending all the way through the bridges and controlled by manually operated valves makes it easy to handle the hose without reducing the speed of the pump.

I claim:

1. A rotary pump comprising a casing containing two overlapping piston chambers provided with lateral intake and discharge openings, bridges separating said intake and discharge openings, two rotary pistons each having piston blades which coöperate alternately with cavities in the other piston, and lugs on said pistons interposed between said blades and said cavities, said cavities having curved bottom walls and having flat side walls which merge into curved surfaces which limit the outer portions of said lugs and said lugs having flat side walls which merge into the surfaces of said piston blades, said first mentioned flat side walls and said second mentioned flat side walls in succession forming portions of opposite surfaces of said lugs extending outwardly and convergently from said piston blades.

2. A rotary pump comprising a casing containing two overlapping piston chambers provided with lateral intake and discharge openings, bridges separating said intake and discharge openings, two rotary pistons each having piston blades which coöperate alternately with cavities in the other piston, and lugs on said pistons interposed between said blades and said cavities, said cavities having curved bottom walls and having flat side walls which merge into curved surfaces which limit the outer portions of said lugs and said lugs having flat side walls which merge into the surfaces of said piston blades, said last mentioned flat side walls being of less width than said first mentioned flat side walls, said first mentioned flat side walls and said second mentioned flat side walls in succession forming portions of opposite surfaces of said lugs extending outwardly and convergently from said piston blades.

3. A rotary pump comprising a casing containing two overlapping piston chambers provided with lateral intake and discharge openings, bridges separating said intake and discharge openings, two rotary pistons each having piston blades which coöperate alternately with cavities in the other pistons, and escape passages extending down through the lower portions of said bridges, said bridges and said passages being so arranged that when the lateral discharge from said cavities is cut off above said bridges during the rotation of said pistons, communication between said cavities and said escape passages is established whereby water-lock is avoided.

4. A rotary pump comprising a casing containing two overlapping piston chambers provided with lateral intake and discharge openings, bridges separating said intake and discharge openings, two rotary pistons each having piston blades which coöperate alternately with cavities in the other piston, the upper surfaces of said bridges being below the line joining the tops of the shafts of said pistons, and escape passages extending down through the lower portions of said bridges, said bridges and said passages being so arranged that when the lateral discharge from said cavities is cut off above said bridges during the rotation of said pistons, communication between said cavities and said escape passages is established whereby water lock is avoided.

5. A rotary pump comprising a casing containing two overlapping piston chambers provided with lateral intake and discharge openings, bridges separating said intake and discharge openings, and two rotary pistons each having piston blades which coöperate alternately with cavities in the other piston, the ends of said blades being provided with horseshoe-shaped grooves the ends of which extend toward the outer edges of said blades and stop short thereof with the middle portion of the grooves located toward the bases of said blades, said grooves constituting a water packing while said blades are passing said bridges.

6. A rotary pump comprising a casing containing two overlapping piston chambers provided with lateral intake and discharge openings, bridges separating said intake and discharge openings, two rotary pistons each having piston blades which coöperate alternately with cavities in the other piston, said bridges having vertical holes extending therethrough and manually controlled valves coöperating with said holes whereby the pressure in the hose lines leading from the pump may be relieved upon opening said valves.

7. A rotary pump comprising a casing containing two overlapping piston chambers provided with lateral intake and discharge openings, bridges separating said intake and discharge openings, two rotary pistons each having piston blades which coöperate alternately with cavities in the other piston, escape passages extending down through the lower portions of said bridges for preventing water-lock between said piston blades and said cavities, said bridges having vertical holes extending therethrough, and manually controlled valves coöperating with said holes whereby the pressure in the hose lines leading from the pump may be relieved upon opening said valves.

8. A rotary pump comprising a base member, a casing containing two overlapping piston chambers provided with lateral intake and discharge openings, external flanges on said casing for securing the same to said base member, bridges separating said intake and discharge openings, the lower surface of said bridges being substantially in the same plane as the lower surface of said flanges, and two rotary pistons each having piston blades which coöperate alternately with cavities in the other piston.

In testimony whereof I hereunto affix my signature.

JOSEPH T. AUGER.